Jan. 10, 1967 K. MONTOR 3,297,824

REMOTE STATION INTERCOMMUNICATION SYSTEM

Filed April 15, 1963

INVENTOR.
KAREL MONTOR

BY

Nolte & Nolte
ATTORNEYS

United States Patent Office 3,297,824
Patented Jan. 10, 1967

3,297,824
REMOTE STATION INTERCOMMUNICATION SYSTEM

Karel Montor, Colonia, N.J., assignor of fifteen percent to Albert C. Nolte, Jr., New York, N.Y.
Filed Apr. 15, 1963, Ser. No. 272,909
7 Claims. (Cl. 179—2)

Figures 1, 2:
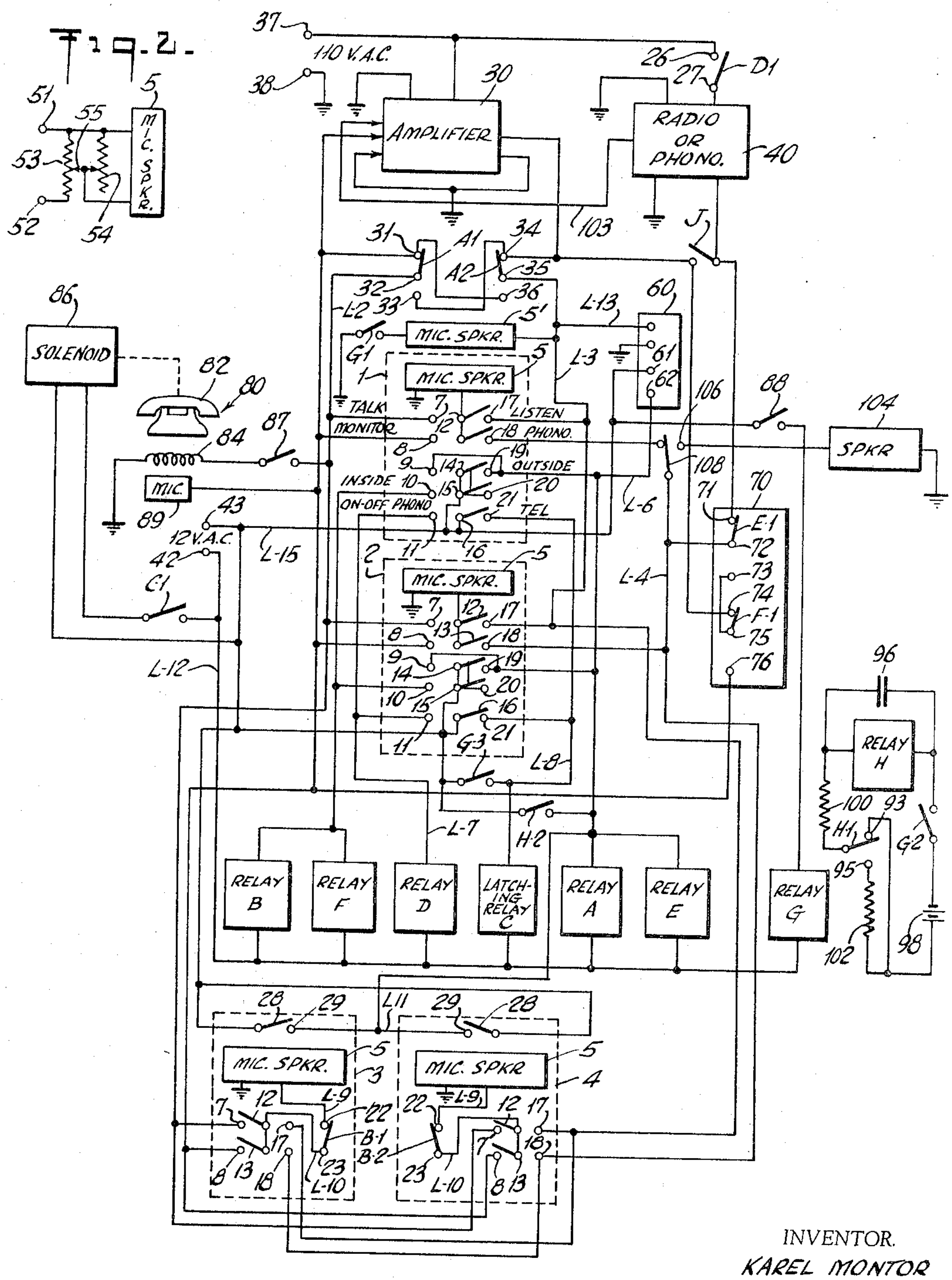

This invention relates to intercommunication systems. More particularly, this invention relates to an intercommunication system including provisions for answering a telephone by remote control, and means for indicating the occurrence of a disturbance, such as a fire or the like, at all stations, in addition to automatically telephoning an alarm.

The present invention may be employed as a modification of the intercommunication system described in my Patent No. 3,024,310, issued March 6, 1962. As will be described in detail below, the system of the patent includes a plurality of parallel connected channels having a common amplifier, and means at each station for switching the input and output of the amplifier so that each station may communicate with every other station, and the number of stations may be increased indefinitely without rearranging the system or increasing the number of trunk lines required. Although the present invention will be described with specific reference to this system, it is to be understood that various features of the invention would have equal utility with different types of intercommunication systems.

An object of this invention is to provide an intercommunication system including means for placing a telephone into the system.

Another object is to provide an intercommunication system wherein each station is capable of answering a telephone without requiring any interconnections to be made with the telephone system itself.

Another object is to provide an intercommunication system including an alarm system for sending an audible signal, upon occurrence of a disturbance, to every station, regardless of its condition.

Still another object is to provide an alarm system capable of placing a warning signal on a telephone line upon occurrence of a disturbance.

Other objects and advantages of the invention will become apparent from the following description and the drawing in which:

FIG. 1 is a schematic circuit diagram of an intercommunication system according to the invention; and FIG. 2 is a diagram of a volume control which may be used with the microphone loudspeakers.

Referring to the drawing, particularly FIG. 1, there are shown four stations 1, 2, 3 and 4. Stations 1 and 2 are considered indoor stations which may be in different rooms of the house and stations 3 and 4 may be located at the front and rear doors of the house. Each station includes a microphone-loudspeaker 5 which as well known in the art may simply be a single loudspeaker serving both as a microphone and a loudspeaker. This is common practice in the intercommunication system art. Hence, it is generally adopted for purposes of convenience and economy, but it will be understood that any equivalent arrangement may be used. Each of the four stations also includes switching means for controlling the various operations of the system. Operation is effected by manually operated switches 12 to 16 having left contacts 7 to 11 and right contacts 17 to 21. The switches 12 to 16 are double-throw switches and all of them may have a center "off" position. Switches 14 to 16 are of the type which automatically return to their center positions.

The outside stations 3 and 4 located outside the house, say at the front door and the rear door, consist of a microphone-speaker 5 and switches 12 and 13 similar to the corresponding switches of the indoor stations and having left contacts 7 and 8 and right contacts 17 and 18 similar to the indoor stations. In addition, each outdoor station is provided with a pair of contacts 22 and 23 adapted to be opened or closed by a relay contactor B1 and B2 for connecting or removing loudspeakers 5 from the system. The outdoor stations are also provided with a switch 28 operated in a manner to be described later, for enabling an outside party to talk to those in the house without any operations being performed at the inside stations. Only switch 28 and the loudspeaker 5 need be outside the house, and the remainder of stations 3 and 4 may be just inside the door.

The system also includes a single amplifier 30 which serves all stations. Connections between the amplifier and the several stations are controlled by relay A having contacts 31 to 36 and relay contactors A1 and A2. The contactors A1 and A2 are normally in the "up" position connecting terminals 31 and 32 and terminals 34 and 35. When relay A is operated contactors A1 and A2 are closed in their "down" position connecting terminal 32 to terminal 33 and terminal 35 to terminal 36, thereby reversing the connections between lines L–2 and L–3 and the input and the output of amplifier 30. Relay A, as well as other relays which will be described later, is energized preferably from a 12 volt alternating current source having terminals 42 and 43. It will be understood that this voltage may be supplied from the regular 110 volt line by a transformer. Of course, any other voltage source, either A.C. or D.C. can be used, depending on availability. Terminal 42 is connected to one side of relay A by line L–12. The other side of relay A is connected by line L–6 to terminal 19 of each indoor station, and to terminals 29 of each outdoor station by the line L–11. Terminal 43 of the 12 volt source is connected by line L–15 to switch 14 of each indoor station and switch 28 of each outdoor station so that by closing switches 14 and 28 relay A can be operated to change over the connection of the stations from the input to the output of amplifier 30 and vice versa.

Terminal 42 of the 12 volt source is also connected to relay B by line L–12. The other side of relay B is only connected to terminal 10 of indoor stations 1 and 2. Terminal 43 of the 12 volt source is connected by line L–15 to switch 14–15 so that closing switch 14–15 on terminal 10 operates relay B. Upon the operation of relay B the normally closed contacts B1 and B2 open and disconnect terminals 22 and 23 and remove loudspeakers 5 of outdoor stations 3 and 4 from the system, thus giving the indoor stations privacy.

Line L–12 also connects terminal 42 of the 12 volt source to relay C. Relay C is of the latching type which alternately opens and closes upon successive energizations. The other side of relay C is connected only to terminals 21 of indoor stations 1 and 2. Relay C operates a contactor C1, in this invention, for enabling each station to answer a remote telephone as will be described in detail below. In the above mentioned Patent No. 3,024,310, relay C was employed as an on-off switch for the amplifier, and, if desired, a similar provision may be included in the present system.

A latching relay D is connected by line L–12 to terminal 42. The other side of relay D is connected only to terminal 11 of each indoor station by line L–7. Terminal 43 of the 12 volt source is connected to switch 16 of stations 1 and 2 so that throwing switch 16 to terminal 11 operates relay D. Switch 16 must be of the type which automatically returns to its center position. Upon operation of relay D relay contactor D1 connects terminals 26 and 27, thereby energizing a radio or phonograph 40 connected to line L–4. Line L–4 extends to terminal 18 of each station so that each station may provide itself with a radio or phonograph program by closing switch 13 on contact 18. Line L–4 is preferably shielded in order to prevent excessive pick-up and maintain the entertainment program at a high quality. If desired, line L–4 instead of extending to the phonograph or amplifier 40 could be connected at J to terminal 34 and thus to the output of amplifier 30 in order to provide each station with an optional permanent or private listening connection.

The loudspeaker of stations 1 and 2 may be connected to its input terminals 51 and 52 through an L-pad volume control device which may consist of a pair of potentiometers or variable resistors 53 and 54 and movable contact 55 which moves on both resistors 53 and 54 in unison but in opposite directions so that the total resistance connected across the terminals 51 and 52 remains nearly constant but the series and shunt resistances connected to the loudspeaker are varied as the contact 55 is adjusted.

Line L–3 may be connected to an outside plug 60, having also a ground connection, so that a loudspeaker at end of a long line can be plugged-in and connected to the output of the amplifier by line L–13. Thus "baby-sitting" or monitoring can be done at a remote point such as a neighbor's house. Lines L–6 and L–15 extend to terminal 61 and 62 to permit the remote station connected to plug 60 to control relay A to talk back to house stations, or to a monitored station in which switch 12 is on contact 7.

The operation of the system as so far described will probably be apparent to those skilled in the art from the above description of the system. It will also be understood that various types of operation are possible, but for the sake of simplicity only one method of operation will be described below. Normally switch 12 of all stations will be thrown to contact position 7, which may be labeled the "talk" contact or position, and extends through terminal 32, contactor A1 and contact 31 to the input of amplifier 30. The output of amplifier 30 is connected via contacts 34 and 35, A2 and line L–3 to contact 17. When a station wants to contact another station switch 12 is thrown to position 17. Switch 14–15 is then thrown to the left, say, that is to the position of the contacts 9 and 10, or to contacts 19 and 20. Contacts 9 and 19 being connected by line L–6 to relay A thereupon cause operation of this relay. Operation of relay A causes contactors A1 and A2 to close connections between contacts 32 and 33 on one side and contacts 35 and 36 on the other side. This causes contacts 7 and line L–2 to be switched from the input to the output of amplifier 30 and causes contacts 17 and line L–3 to be switched from the output to the input of the amplifier. Hence, the station, say station 1 in which the switches are being operated connects itself via contact 17 to the input of the amplifier and connects all other stations via contact 7 to the output of the amplifier. Station 1 may then talk to all other stations. If switch 14–15 has been thrown to the left, that is, the contacts 9 and 10 then in addition to operating relay A, relay B has also been operated via line L–5 and this causes the opening of contactors B1 and B2 and disconnection of the outside stations 3 and 4, so that communication is had only with the indoor stations. Of course, if it is desired to answer the front door or the rear door stations 3 and 4 then switch 14–15 is thrown to the right and conversation can then be conducted with the outside stations. Switch 14–15 is arranged to automatically return to the center position. After station 1 has called then and desires to listen for the answer of station 2, station 1 permits switch 14–15 to return to its center position, thus operating relay A to its normal position and restoring station 2 and all other stations to the "talk" condition while station 1, having switch 12 on contact 17 is in the listen position. Thus, the entire conversation can be controlled by the "calling" station and the "called" station need perform no operations whatever.

A selected station can be put in a permanent "monitor" position so that whatever is happening, say in the room of station 1, can be monitored by any other station, as is desired, for example, where a baby is asleep in a certain room and the station is being used to determine when the baby awakes or something happens requiring attention. To serve this function station 1 throws switch 13 to "monitor" position 8, which permanently connects microphone-speaker 5 of that station to line L–1 and the input of amplifier 30. Any other station then, by throwing switch 12 to position 17 can monitor station 1. Since the monitored station is permanently connected only to the input of the amplifier no messages can be fed into the room which is being monitored and the remainder of the system can therefore be used in a normal way without disturbing the monitored room.

If the person in any room or at any station desires to listen to a radio or phonograph program he may do so by throwing switch 16 to position 11, thereby operating relay D through line L–7 to place the radio or phonograph 40 in operating condition. Then by throwing the switch 13 to position 18 the loudspeaker 5 of that station is connected to the line L–4 to the output of the radio or phonograph 40.

When an outside station desires to speak to an inside station switch 12 is thrown to position 17 and switch 28 is operated. The operation of the latter switch connects relay A to line L–11 and terminal 29 to terminal 43 of the 12 volt source and causes operation of relay A. The operation of relay A as previously described causes relay A to reverse the connection to amplifier 30 so that contact 17 is connected to the input of the amplifier while the contacts 7 of the other stations, for example, the indoor stations are connected to the output of the amplifier. The outdoor station may then talk to the indoor station. By opening switch 28 the outdoor station may place itself in the listen position and re-connect the inside station to the talk position. In this way a conversation can be managed at the outside station in a manner similar to that which has already been described with respect to the inside stations.

If it is desired to provide for contacting a station listening to music, i.e., to radio or phonograph 40, a unit 70 may be provided comprising relays E and F. These relays have their windings connected in parallel with those of relays A and B, respectively. Alternatively, instead of relays E and F, relay A may be provided with additional contacts 71, 72 and 73 and relay B with contacts 74, 75 and 76. With this arrangement a station listening to radio or phonograph 40, i.e., having switch 13 on contact 18 may be called by throwing switches 12 and 14–15 to the right. This causes relays A and E to operate so that the connection from contact 18 to 72 is switched by contactor E1 from contact 71 to contact 73 and from there through contact 75, contactor F1 and contact 74 to the output of the amplifier. This operation will be performed with respect to all stations which were connected to radio or phonograph 40. When, next, the calling station desires to hear the called station switches 12, 14 and 15 are thrown to the left and this causes relays A, E, B and F to operate. Contactor F1 then connects terminal 75 to terminal 76 and line L–1, so that the called station is connected to the input of the amplifier and may talk to the calling station, which is then connected to the output of the amplifier.

Relay D may have two sets of contacts such that one set is closed when the other is open, and vice versa. Then each set of contacts may control the operation of a different radio or phonograph 40, so that one or the other may be selected by operating relay D to one position or the other by means of switch 16. A station can both listen to the radio or phonograph 40 and monitor other stations at the same time by throwing switches 12 and 13 to terminals 17 and 18.

According to the present invention, it is possible to answer a telephone at any of the indoor stations. Telephone 80 is conventional and includes a receiver 82 and voice coil 84 which is coupled into the telephone system when receiver 82 is removed from its cradle. The telephone per se forms no part of the present invention and therefore will not be described in detail. A solenoid 86 is connected in series with contact C1 of latching relay C. One end of latching relay C is connected to terminal 42 of the twelve volt A.C. source, while the other end of the relay is connected through normally open parallel switch contacts 16 and 21 to the terminal 43 of the source. Relay C may be any conventional type of latching relay that alternately opens and closes upon successive energizations of the relay coil. In an operative embodiment, a commercially available, mechanical latching relay was employed for this purpose. Solenoid 86 is also a conventional commercially available item, adapted to life receiver 82 from its cradle when the solenoid coil is energized.

When the phone rings it may be answered at any of the indoor stations by moving switch 16 to contact 21 to energize latching relay C. Switch 16 is spring biased to its normal center position so that relay C is latched in its closed position until switch 16 is again thrown to contact 21. When latching relay C is energized, contact CI closes, which in turn energizes solenoid 86. The solenoid removes receiver 82 from the cradle of telephone 80 thus placing voice coil 84 on the input of amplifier 30. To converse with the calling party, switch 14 is then thrown to contact 9 to energize relay A by connecting this relay across terminals 42 and 43 of the A.C. source.

Assume that switch 12 is in contact position 7 so that microphone-loudspeaker 5 is connected to the input of the amplifier. When the phone rings, the answering party places switch 16 to position 21, switch 12 to position 17, and switch 14 to position 9 to acknowledge the call. When switch 14 energizes relay A, contacts A1 and A2 are switched to terminals 33 and 36 of the amplifier, thus connecting microphone-speaker 5 to the input of amplifier 30 and voice coil 84 of telephone 80 to the amplifier output. Hence, the answering party is effectively capable of coupling the calling party into the intercommunication system. When switch 14 is returned to its center position deenergizing relay A, the calling party is again connected to input of the amplifier and the receiving party to the output, whereby the calling party may speak to the receiving party. When the call is completed, switch 16 is operated again to position 21. The contacts of latching relay C are thus opened, returning receiver 82 to the cradle of telephone 80 and removing voice coil 84 from the intercommunication circuit. If switch 13 of a given station is thrown to monitor position 8, that station cannot be used to communicate with the telephone, since the microphone speaker 5 of that station is permanently connected to the input of the amplifier. Thus, to prevent the telephone conversation (or any other signal) from being received at a selected station, it is only necessary to place switch 13 in position 8 at that station.

A normally closed switch 87 may be connected in the line between voice coil 84 and line L–2 so that a person can disconnect the telephone from the intercommunication system if he desires to maintain a private conversation. Furthermore, a microphone 89, permanently connected to the input of amplifier 30, may be employed to pick up the "ringing" of the telephone so that every station connected to listen contact 17 will be assured of receiving the telephone ring.

The intercommunication circuit as above described is particularly well suited for supplemental use as a fire alarm system or the like. For example, a circuit including a temperature responsive switch 88 and a relay G may be connected across terminals 42 and 43 of the twelve volt A.C. source. For purposes of clarity, only one temperature responsive switch 88 has been illustrated although it will be obvious to one skilled in the art that the system may be responsive to any desired members of such switches connected in parallel and located in various sections of the house. Switch 88 is conventional and, if preferred, may be responsive to smoke, fire, or any other disturbance (e.g. burglary) or combination thereof, whereby upon activation the switch is closed to energize relay G. It should also be clear that, if desired, switch 88 may be also used to energize a conventional alarm circuit to provide a fail-safe apparatus in case the power supply for the intercommunication system should fail.

When relay G is energized, it connects the input of the amplifier across the amplifier output providing a positive feedback which causes the amplifier to oscillate. These oscillations are in the audio frequency range so that when coupled to the microphone speaker combinations 5, an audible alarm signal is emitted to warn the occupants of the house that the disturbance has occurred. Many arrangements could be used to accomplish this objective, and in one operative embodiment the feedback circuit included a pair of microphone-speaker combinations 5 and 5' physically oriented so that the transducers were facing each and spaced relatively close together. As illustrated, the circuit may be formed by simply adding another microphone-speaker 5' to the microphone speaker 5 of an existing station 1. In operation, when relay G is energized, relay contact G1 connects microphone-loudspeaker 5' across the output terminals of amplifier 30. The extraneous noise present in the amplifier is accoustically coupled to microphone-loudspeaker 5 which reconverts the audio signals into electrical energy and couples the electrical signals to the input of amplifier 30. Amplifier 30 accordingly will oscillate at an audio frequency so that an audible tone or alarm is produced at every station whose microphone-speaker is connected to the output of the amplifier.

Since some of the microphone-speakers may not normally be connected to the output of the amplifier, and since it is desirable to give an alarm in each station of the house, additional means are provided to periodically energize relay A in order to continuously reverse the input and output amplifier connections so that every microphone-speaker combination will be connected to the output of the amplifier. For these purposes, a conventional oscillator circuit 94 is energized by a second contact G2 of relay G upon occurrence of the disturbance. The oscillator includes a relay H, a capacitor 96 and a source of D.C. potential 98 together with a charging resistor 100 and a resistor 102. When switch 88 energizes relay G, relay contact G2 closes, connecting capacitor 96 in circuit with charging resistor 100 and D.C. source 98 through terminal 93 and contact H1. The capacitor charges until the voltage across it reaches the "pull in" voltage of relay H, at which point relay H is energized and relay contact H1 is thrown to terminal 95 disconnecting capacitor 96 and battery 98. Capacitor 96 then begins to discharge through the coil of relay H. When the voltage across the capacitor reaches the relay's "drop-out" voltage the relay is de-energized, causing H1 to disconnect the discharge circuit. The cycle then begins again. The frequency of oscillation is dependent upon the values of resistors 100 and 102 and capacitor 96. In one operative embodiment, relay H was operated at a frequency of two cycles per second.

A second normally open contact H2 of relay H is connected in series with relay A. It will be recalled that contacts A1 and A2 of relay A are operative to switch the input and output of amplifier 30 so that whatever stations were previously connected to the input of amplifier 30 will be connected to the output upon energization of relay A. Thus, the opening and closing of contact H2 by oscillator 94 periodically energizes relay A, which in turn cyclically reverses the station connections to amplifier 30. Hence, regardles of the position of switch 12, at some time during each cycle every microphone-speaker combination 5 will be connected to the output of amplifier 30 to pick up the audio alarm tone generated in response to the closing of switch 88.

As a further refinement, relay G may include a third contact G3 which is adapted to connect latching relay C across the twelve volt source when switch 88 is closed. It will be recalled that energization of relay C causes solenoid 86 to remove receiver 82 from the cradle of telephone 80, thus connecting voice coil 84 to the input of amplifier 30. However, the cyclical energization of relay A periodically will connect voice coil 84 to the output of amplifier 30, so that a tone will be generated and coupled to the telephone line where it may be detected at a remote point by means of conventional filters or the like. The alarm signal may then be employed to warn the fire department or police of the occurrence of the disturbance.

A simple modification of the present intercom system can provide a binaural or stereophonic audio system at one or more stations. The radio or phonograph 40 contains its own amplifier and is normally adapted to be connected to the speaker at a given station by operating switch 13 to position 18 after the phonograph has been actuated by closure of switch D–1. For a stereophonic system, the phonograph is provided with a binaural cartridge with the first channel connected to the phonograph amplifier, and the second channel of the cartridge fed via lead 103 to the input of amplifier 30.

If it is desired to introduce the binaural system into a given room, for example station 1, a second speaker 104 is placed at that station in the proper audio relationship with speaker 5 to provide a stereophonic effect. Speaker 104 may include a terminal 106 adapted to be contacted by a single-pole double-throw switch 108, which normally closes the connection from the phonograph to "phono" terminal 18 at the individual stations. Thus, to provide a stereophonic system, switch 108 is thrown to terminal 106, connecting the first audio channel from the output of the phonograph amplifier to speaker 104. Switch 12 is thrown to position 17 which causes the output of amplifier 30, the second binaural channel, to be coupled to speaker 5, thus producing a binaural system.

It is to be understood, of course, that this stereo effect may be achieved at any location by the use of any additional speaker 104 properly positioned with the loudspeaker 5 of that station. Similarly, as a matter of convenience, switch 108 and terminal 106 will normally be located on the control panel of the particular stations, although the switch is illustrated outside of the station in the present instance for the sake of clarity.

It will be apparent that many variations and modifications of the system disclosed herein can be made without departing from the teachings of the invention. Such changes may be dictated in some instances by the flexibility or capabilities of the system desired in particular installations, as already pointed out in several respects. Many other variations will be apparent to those skilled in the art. Hence the invention is not to be construed as limited except as defined in the following claims.

What is claimed is:

1. An intercommunication system having a plurality of stations, each of said stations including microphone-loudspeaker means, at least one telephone normally separate from said intercommunication systems, microphone means disposed in audible relationship with said telephone for picking up ringing signal of said telephone, and an amplifier common to all of said stations, said microphone means being permanently connected to the input of said amplifier means, each of said stations including means for selectively interconnecting said telephone and the microphone-loudspeaker of that station with the input and output terminals of the said amplifier, whereby a station may be placed in communicative relationship with said telephone.

2. An intercommunication system having a plurality of stations, each of said stations including microphone-loudspeaker means, at least one telephone normally separate from said intercommunication system, microphone means disposed in audible relationship with said telephone for picking up ringing signal of said telephone, and an amplifier common to all of said stations, said microphone means being permanently connected to the input of said amplifier means, each of said stations including first means for connecting said telephone to the input of said amplifier, second means for connecting said microphone-loudspeaker to the output of said amplifier and switch means for selectively reversing the input and output of said amplifier whereby said microphone loudspeaker may be connected to the input of said amplifier and said telephone connected to the output of said amplifier.

3. An intercommunication system according to claim 2, wherein said telephone has associated therewith means for lifting the telephone receiver from its cradle.

4. An intercommunication system according to claim 3 wherein said means for lifting the telephone receiver from its cradle includes a solenoid for removing the telephone receiver from its cradle, a latching relay for energizing said solenoid, and a switch for energizing said relay.

5. An intercommunication system comprising a plurality of parallel connected stations, an amplifier common to all of said stations, each station including a microphone-loudspeaker, each station having a talk contact normally connected to the input of said amplifier and a listen contact normally connected to the output of said amplifier, each station further including switch means for connecting its microphone-loudspeaker to either the talk contact or the listen contact, means for reversing the connections between the talk and listen contacts and the input and output of the amplifier whereby the connections of all stations with respect to the input and output of the amplifier are reversed, means for detecting the occurrence of a disturbance, means for applying an alarm signal to the input of said amplifier in response to said disturbance, and means for cyclically reversing the amplifier input and output terminals whereby said alarm signal is cyclically fed to all of said stations, said cyclically reversing means being an automatic means actuated by said disturbance detecting means.

6. An intercommunication system according to claim 5, including a telephone and means for connecting the pickup coil of said telephone to the output of said amplifier in response to said disturbance, whereby said alarm signal is coupled to the telephone line, said telephone being normally separate from said intercommunication system.

7. An intercommunication system as claimed in claim 1, wherein at least one of said stations includes additional loudspeaker means, and a two channel audio source having a single amplifier coupled to one channel, said one station including switch means for connecting the output of said single amplifier to said additional loudspeaker means, and for connecting the other of said audio channels to the input of said common amplifier.

References Cited by the Examiner

UNITED STATES PATENTS

| | | | |
|---|---|---|---|
| 2,071,053 | 2/1937 | Varley | 179—1 X |
| 2,761,014 | 8/1956 | Novreske | 179—40 |
| 2,845,492 | 7/1958 | Kaye et al. | 179—99 |
| 2,942,245 | 6/1960 | Wooten | 179—5 X |
| 2,990,455 | 6/1961 | Jung | 179—100.2 |
| 3,005,873 | 10/1961 | Janowsky | 179—1.3 |
| 3,198,888 | 8/1965 | Lemelson | 179—41 |

DAVID G. REDINBAUGH, *Primary Examiner.*

J. T. STRATMAN, *Assistant Examiner.*